United States Patent [19]
Bachmann

[11] 3,739,080
[45] June 12, 1973

[54] COLOR TELEVISION CAMERAS

[75] Inventor: Horst Bachmann, Darmstadt, Germany

[73] Assignee: Fernseh GmbH, Darmstadt, Germany

[22] Filed: June 9, 1972

[21] Appl. No.: 261,441

Related U.S. Application Data

[63] Continuation of Ser. No. 85,923, Nov. 2, 1970, abandoned.

[30] Foreign Application Priority Data

Nov. 26, 1969 Germany ...................... P 19 59 328

[52] U.S. Cl. ............................................. 178/5.4 E
[51] Int. Cl. ............................................. H04n 9/08
[58] Field of Search ................... 178/5.4 E, 5.4 TC, 178/5.4 R

[56] References Cited

UNITED STATES PATENTS 3,586,760 6/1971 Dillenburger .................... 178/5.4 E
3,602,637 8/1971 Katsuta .......................... 178/5.4 ST

*Primary Examiner*—Richard Murray
*Attorney*—Carroll B. Quaintance, James H. Littlepage, James C. Wray et al.

[57] ABSTRACT

An optical system for a color television camera comprises a beam-splitting arrangement for separating an incident light beam into three partial beams corresponding respectively to three different parts of the visible spectrum, the three partial beams being supplied to the photoelectric cathodes of respective camera tubes. One of the partial beams is supplied to the respective photoelectric cathode by way of an intermediate lens, so that the size of the image on that photoelectric cathode is different from the size of the images on the other two photoelectric cathodes.

5 Claims, 1 Drawing Figure

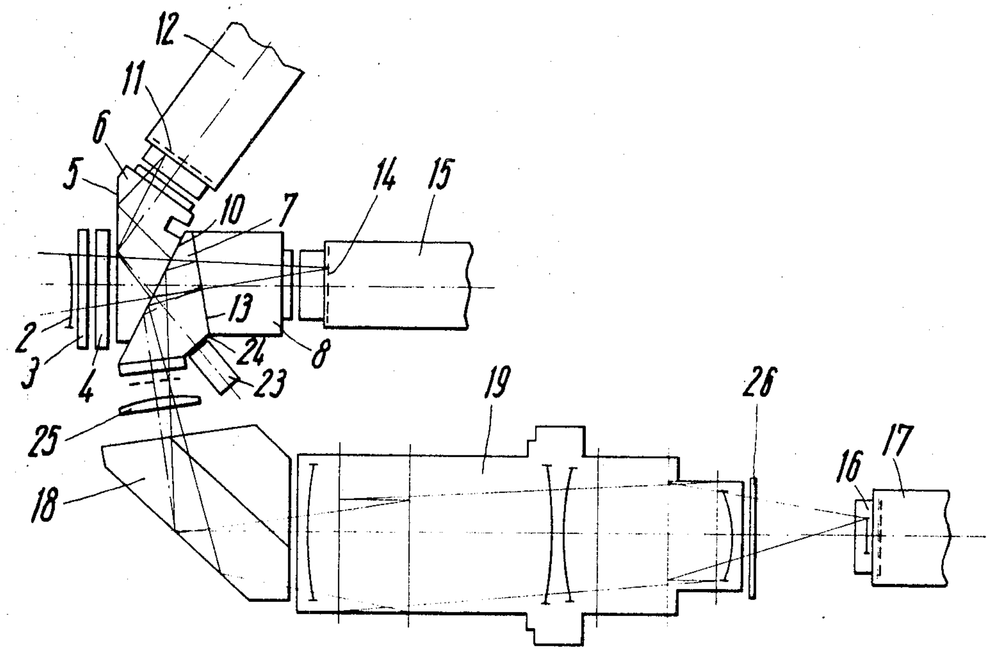
Inventor:
Horst Bachmann
by
Littlepage, Quaintance, Wray & Aisenberg
Attorneys

COLOR TELEVISION CAMERAS

This is a continuation of application Ser. No. 85,923, filed Nov. 2, 1970, now abandoned.

BACKGROUND OF THE INVENTION

Color television cameras generally include a plurality of camera tubes, on the photoelectric cathodes of which the image of the object to be transmitted is formed in different spectral regions. The splitting of the incident light beam from the object is effected by means of dichroic coatings disposed on mirror or prism faces.

SUMMARY OF THE INVENTION

One object of the present invention is to provide a new or improved optical system for a color television camera.

Another object of the present invention is to provide an optical system for a color television camera which enables the image corresponding to one spectral region to be of a different size from that of the images corresponding to the other two spectral regions.

According to the present invention there is provided an optical system for a color television camera, the optical system comprising the combination of:

a main camera lens system;

a first prism with a first face through which, in use, a light beam from the lens system passes into the first prism, a second face on which there is a first dichroic coating which internally reflects a part of the light beam in a first region of the visible spectrum to form a first partial light beam which is totally internally reflected at the first face, and a third face from which the first partial light beam emerges from the first prism;

a first camera tube having a photoelectric cathode on which an image is formed by the first partial light beam after emerging from the third face of the first prism;

a second prism with a first face which, with an interposed air gap, is parallel to the second face of the first prism, a second face on which there is a second dichroic coating which passes a second partial light beam in a second region of the visible spectrum and internally reflects a third partial light beam in a third region of the visible spectrum, and a third face from which the third partial light beam emerges from the second prism;

a second camera tube having a photoelectric cathode on which an image is formed by the second partial light beam after emerging from the second face of the second prism;

deflection means for deflecting the third partial light beam into a direction substantially parallel to the optical axis of the lens system after the third partial light beam has emerged from the third face of the second prism;

an intermediate lens; and a third camera tube having a photoelectric cathode on which an image is formed by the third partial light beam after passing through the intermediate lens, the image on the photoelectric cathode of the third camera tube being different in size from the images on the photoelectric cathodes of the first and second camera tubes.

In comparison with optical systems with known prism beam splitters, the optical system according to the invention affords the advantage that the image size for a selected one of the color images can be freely chosen, while the advantageous properties of the prism beam splitter are maintained for the other two images corresponding to the other spectral regions. By virtue of the free selection of the image size for the selected image, that image can be projected on a smaller scale, for example with substantially half the area of the other two images. This image preferably corresponds to the blue spectral region and in that case a smaller proportion of the total light beam is required for the same afterglow performance in the blue channel. This results in the color television camera having a lower light requirement.

The arrangement of an intermediate lens provides the further advantage that for the light beam passing through the intermediate lens, the restrictions as regards the arrangement of the camera tubes due to the small predetermined optical length of path between the main camera lens system and photoelectric cathodes of the camera tubes are abolished. This gives rise to the possibility of effecting deflection of the light beam in the path of the light beam for the intermediate lens, and of arranging the intermediate lens and the associated camera tube, for example, parallel to the optical axis of the main camera lens system. In comparison with color television cameras with the conventional prism beam splitters, this arrangement allows the size of the color television cameras, preferably the height, to be substantially reduced.

BRIEF DESCRIPTION OF THE DRAWING

An optical system for a color television camera, the system being in accordance with the present invention will now be described by way of example with reference to the accompanying drawing, in which the sole FIGURE shows a section through the optical system with the ray path illustrated.

DESCRIPTION OF THE PREFERRED EMBODIMENT

In the FIGURE, the light beam which enters the color television camera passes through the main lens system, of which only the rearward face of a rear lens 2 is illustrated, through two filters 3 and 4, and through a face 5 into a first prism 6 of the beam splitting system comprising prisms 6, 7 and 8. The filter 3 can be a rotatable filter disc. The adjacent faces of the prisms 6 and 7 are separated by a small air gap. On a face 10 of the prism 6 is a first dichroic coating which reflects the central part of the visible spectrum, that is, the middle wavelengths including the wavelengths to which the human eye is most sensitive and the primary color green. By total reflection at the face 5, this partial light beam is passed to a photoelectric cathode 11 of a television camera tube 12. The part of the spectrum which passes through the dichroic coating on face 10 is again split at a face 13 of the prism 7, which face 13 is provided with a second dichroic coating. The long-wave (red) part is allowed to pass through the dichroic coating on face 13 and passes to the photoelectric cathode 14 of the camera tube 15.

The short-wave (blue) part of the spectrum, which is reflected by the dichroic coating 13, emerges from the prism 7 after total reflection at the face of the prism 7 which is towards the air gap, and after being totally internally reflected by a prism 18, passes into an intermediate lens 19 which projects an image on the photoelectric coating 16 of the camera tube 17. This image is in the blue spectral region and is of a smaller size than the images on the photoelectric cathodes 11 and 14 of the camera tubes 12 and 15. Arranged between the prisms 7 and 18 is a field lens 25. A filter 26, shown at the output of intermediate lens 19, is possibly used to adapt the blue spectral region to the desired spectral division.

When using plumbicon-type camera tubes, it has been found desirable, in order to reduce afterglow with low object-illumination, for the photoelectric cathodes (coatings) of the camera tubes to be illuminated with a constant priming illumination. In order to introduce this additional light into the optical system, a flat face 24 can be ground on the prism 7, through which face 24 the additional light passes by way of a lens 23 into the optical system. The additional light beam impinges on the dichroic coating on face 10 in the same region as that in which the coating is encountered by the light beam which passes through the main camera lens system. The additional light beam is split into partial light beams by the dichroic coating. The partial light beam of the additional light, which passes through the dichroic coating on face 10, is travelling in the same direction as the part of the light beam from the main camera lens system, that part being reflected at the same dichroic coating. It therefore passes over the same path as the reflected part to the photoelectric cathode 11 of the camera tube 12. The part of the additional light beam which is reflected at the dichroic coating on face 10 is travelling in the same direction as the part of the light beam from the main camera lens system, which part passes through the dichroic coating. It therefore passes together therewith to the photoelectric cathodes 14 and 16 of the camera tubes 15 and 17.

Various modifications can of course be made without departing from the invention as defined by the appended claims.

What is claimed is:

1. In an optical system for a color television camera comprising:

A. first, second, and third camera means each having photoelectric means for developing a video signal from an optical image, B. a main camera-lens means for providing a light beam representing the optical image, C. first reflector means for reflecting a first part of the light beam within a first spectral region to cause the first part to focus on the photoelectric means of the first camera means and for transmitting a first remainder of the light beam, D. second reflector means for reflecting a second part of the light beam within a second spectral region, said second part being taken from said first remainder, thereby causing the second part to focus on the photoelectric means of the second camera means and for transmitting a second remainder of the light beam in a third spectral region to focus on the photoelectric means of the third camera means, the second remainder being effectively the first remainder minus the second part, and E. intermediate lens means in front of the photoelectric means of a selected one of the camera means for causing the optical image in the corresponding spectral region which appears on the photoelectric means of the selected camera means to have a different overall image size from the optical images appearing on the photoelectric means of the remaining two camera means, the improvement comprising;

F. said first and second reflector means respectively comprising a first dichroic coating between a first and a second prism and a second dichroic coating between the first and a third prism, and G. priming illumination means comprising a source of constant illumination directed into the first prism and striking the first and second dichroic coatings respectively directly and by reflection to be divided thereby into three partial priming beams for application to the respective photoelectric means of the three camera means.

2. An optical system according to claim 1 wherein the first, second, and third spectral regions are characterized respectively by green, red, and blue light.

3. An optical system according to claim 1 wherein the image on the photoelectric means of the third camera means is approximately one half the area of images on the photoelectric means of the first and second camera means.

4. An optical system according to claim 1 further comprising a fourth prism for deflecting the second remainder beam by total internal reflection into said intermediate lens means.

5. An optical system according to claim 1 wherein the first dichroic coating between the first and second prisms reflects green light through the second prism to the photoelectric means on the surface of the first camera means.

* * * * *